(12) United States Patent
Baek et al.

(10) Patent No.: US 7,236,289 B2
(45) Date of Patent: Jun. 26, 2007

(54) FAST OPTICAL SHUTTER USING MICROMIRROR MOTION

(75) Inventors: Sang Hyune Baek, Suwon (KR); Gyoung Il Cho, Seoul (KR); Cheong Soo Seo, Seongnam (KR)

(73) Assignees: Angstrom, Inc., Suwon (KR); Stereo Display, Inc., Anaheim, CA (US)

( * ) Notice: Subject to any disclaimer, the term of this patent is extended or adjusted under 35 U.S.C. 154(b) by 0 days.

(21) Appl. No.: 11/359,121

(22) Filed: Feb. 21, 2006

(65) Prior Publication Data

US 2006/0139731 A1    Jun. 29, 2006

Related U.S. Application Data

(63) Continuation-in-part of application No. 11/191,886, filed on Jul. 28, 2005, now Pat. No. 7,095,548, and a continuation-in-part of application No. 11/076,616, filed on Mar. 10, 2005, and a continuation-in-part of application No. 11/072,597, filed on Mar. 4, 2005, and a continuation-in-part of application No. 10/983,353, filed on Nov. 8, 2004, and a continuation-in-part of application No. 10/893,039, filed on Jul. 16, 2004, and a continuation-in-part of application No. 10/872,241, filed on Jun. 18, 2004, and a continuation-in-part of application No. 10/857,714, filed on May 28, 2004, now Pat. No. 7,161,729, and a continuation-in-part of application No. 10/857,280, filed on May 28, 2004, now Pat. No. 6,999,226, and a continuation-in-part of application No. 10/855,715, filed on May 27, 2004, now Pat. No. 7,031,046.

(51) Int. Cl.
*G02B 26/00*    (2006.01)
*G02B 26/08*    (2006.01)

(52) U.S. Cl. .................. 359/291; 359/290; 359/298

(58) Field of Classification Search ............... 359/291, 359/290, 298, 223, 224, 846, 871, 872
See application file for complete search history.

(56) References Cited

U.S. PATENT DOCUMENTS

| 5,455,083 | A | 10/1995 | Noh |
| 6,757,094 | B2 | 6/2004 | Carlson |
| 6,762,866 | B2 | 7/2004 | Carra |
| 6,900,901 | B2 * | 5/2005 | Harada .................. 358/1.1 |
| 6,901,204 | B2 | 5/2005 | Hong |
| 6,965,477 | B2 | 11/2005 | Someno |
| 6,972,889 | B2 | 12/2005 | Goodwin-Johansson |

* cited by examiner

*Primary Examiner*—Loha Ben
*Assistant Examiner*—Jack Dinh

(57) ABSTRACT

The present invention provides a fast optical shutter function by use of the fast movement of the micromirrors. In a micromirror array lens (MMAL), all the micromirrors reflect the incident light to form an image on the image plane. If the micromirrors reflect the incident light out of the optical sensor area, then the optical sensor can not have any optical signal just like the incident light blocked. By just changing the beam path by MMAL motion, the micromirror array lens has a function for optical shutter.

8 Claims, 6 Drawing Sheets

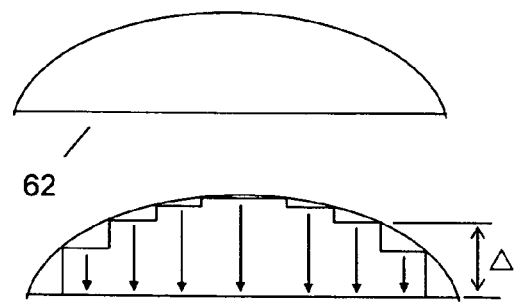
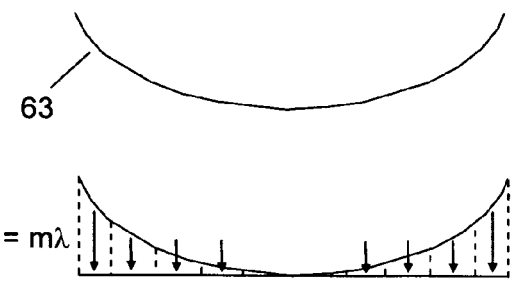
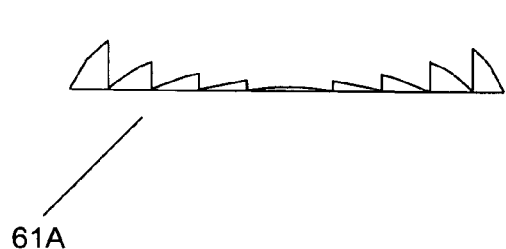
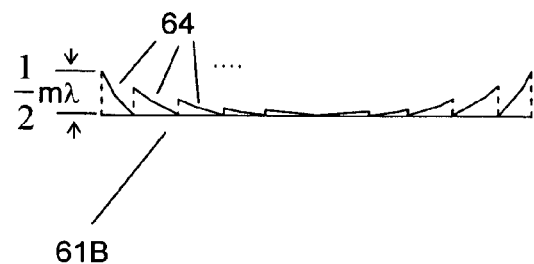
FIG. 6A  FIG. 6B
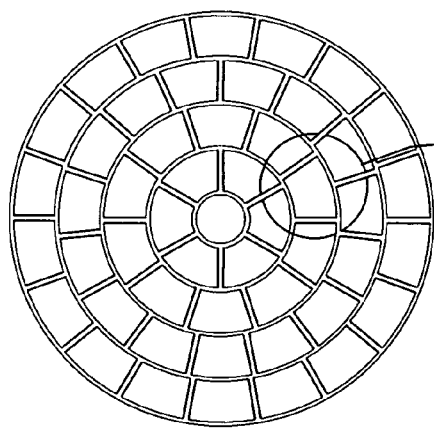
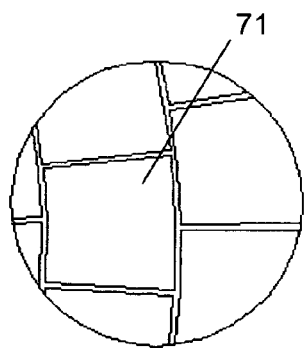
FIG. 7A  FIG. 7B

FAST OPTICAL SHUTTER USING MICROMIRROR MOTION

REFERENCES TO RELATED APPLICATIONS

This application is a continuation-in-part of, and claims priority to U.S. patent application Ser. No. 10/855,715 filed May 27, 2004 now U.S. Pat. No. 7,031,046, U.S. patent application Ser. No. 10/857,714 filed May 28, 2004 now U.S. Pat. No. 7,161,729, U.S. patent application Ser. No. 10/857,280 filed May 28, 2004 now U.S. Pat. No. 6,999,226, U.S. patent application Ser. No. 10/872,241 filed Jun. 18, 2004, U.S. patent application Ser. No. 10/893,039 filed Jul. 16, 2004, U.S. patent application Ser. No. 10/072,597 filed Mar. 4, 2005, and U.S. patent application Ser. No. 10/983,353 filed Nov. 8, 2004, U.S. patent application Ser. No. 11/076,616 filed Mar. 10, 2005, and U.S. patent application Ser. No. 11/191,886 filed Jul. 28, 2005 now U.S. Pat. No. 7,095,548, all of which are hereby incorporated by reference.

FIELD OF INVENTION

The present invention relates to optical shutter and functional micromirror devices.

BACKGROUND OF INVENTION

In optics fields, optical shutter plays an important role for getting high quality image, and controlling the light. For having shutter function for the optical devices, many methods and apparatuses are invented and currently used.

Mechanical shutter is most widely used for the optical systems. Light reflecting plate or light absorbing plate is used for blocking the input light and is controlled by the mechanical structure. One of the examples of mechanical shutter can be found in U.S. Pat. No. 6,762,866. Fast moving metal blade blocks the laser light or unblocks the laser light. The blade is controlled by the solenoids or AC or DC motors that can be rapidly operated by the shaped electrical pulses. Diaphragm structure is also introduced for having better quality and speed.

Liquid crystal can also be used for building the optical shutter which is described in U.S. Pat. No. 5,455,083. Nematic liquid crystal is applied for the optical shutter function. The liquid crystal cluster can be aligned for blocking the light and also can be aligned for transmitting the light. To enhance the performance of the optical shutter function, additional polarizing optics can be applied to the system. Liquid crystal optical shutter has low contrast ratio and slow shutter speed.

For fast controlling of the light especially laser light, satiable absorber can be applied to the optical shutter system. The schematics of the optical shutter using satiable absorber are described in the U.S. Pat. No. 6,757,094. A photon absorbing layer is applied to the system and when light is passing the layer, the light is absorbed up to a certain level. Beyond this level, the material becomes transparent and the layer does not block the light any more. The saturation process is very fast and the optical shutting time also can be very fast. Since the process is only controlled by the absorbing process of the light, extra light control system is required for the system and the speed is only determined by the satiable absorbing material properties. For fast shuttering the optical signal, a Pockel's cell is also used. Electro-optics effect is used and the polarization change makes the optical shutter work.

Optical shutter function using interference effect is another method for optical shutter, which is described in the U.S. Pat. No. 6,965,477. A movable filter is applied to the system to control the light transmission or reflection. The gap between the fixed layer and the movable layer is determined by the incident light wavelength to make constructive or destructive interference of the incident light. Since the structure should be controlled within wavelength of the incident light, the optical shutter is difficult to control and gives undesired error due to the motion control error.

For a small beam size, micro electro mechanical system (MEMS) is applied to get a optical shutter function. A block translated by the micro-electric actuator to block the incident beam or unblock the beam even to control the amounts of the incident beam. Those kinds of micro-mechanical shutter systems are described in the U.S. Pat. No. 6,901,204 and U.S. Pat. No. 6,972,899. Since the MEMS device is small and fast for the optical shutter, MEMS device can be used as a good fast working optical shutter only if it can be made for optical shutter.

SUMMARY OF INVENTION

The present invention of the fast optical shutter using micromirror motion is a micromirror array lens (MMAL) based invention. While using MMAL, the optical shutter function can be obtained by applying a special motion to the MMAL system.

The MMAL system comprises a plurality of micromirrors and the following US patents and applications describe the MMAL: U.S. Pat. No. 6,934,072 to Kim, U.S. Pat. No. 6,934,073 to Kim, U.S. Pat. No. 6,970,284 to Kim, 2004, U.S. patent application Ser. No. 10/855,715 filed May 27, 2004, U.S. patent application Ser. No. 10/857,714 filed May 28, 2004, U.S. patent application Ser. No. 10/857,280 filed May 28, 2004, U.S. patent application Ser. No. 10/872,241 filed Jun. 18, 2004, U.S. patent application Ser. No. 10/893,039 filed Jul. 16, 2004, U.S. patent application Ser. No. 10/072,597 filed Mar. 4, 2005, and U.S. patent application Ser. No. 10/983,353 filed Nov. 8, 2004, U.S. patent application Ser. No. 11/076,616 filed Mar. 10, 2005, and U.S. patent application Ser. No. 11/191,886 filed Jul. 28, 2005, all of which are hereby incorporated by reference.

On the contrary that the common optical shutters block or attenuate the incident light, the fast optical shutter by micromirror motion in the present invention does not uses the beam block or attenuator. The optical shutter just redirects the incident light out of the optical sensor area. Since the optical sensor cannot have any incident light from the input optics system, the sensor feels just like that the incident light is blocked. The MMAL reflects the incident light out of a sensor to block the incident light when the shutter is on and MMAL focus the incident light on a sensor to image when the shutter is off.

In MMAL, each micromirror redirects the incident light to the desired position onto the optical sensor. By making a specified motion, the array of the micromirrors can focus the incident light or defocus the incident light. While MMAL forms a lens, the reflected light from the MMAL goes to the optical sensor to make an image. While MMAL plays a shutter function, just like forming a lens by the array of the micromirrors, the array of the micromirror can deflect the incident light but this time the incident light is deflected out of the sensor area.

When the optical sensor such as CCD and CMOS is exposed too much time, the sensor has a signal noise. The optical shutter can prevent a sensor to be over-exposed.

When the intensity of incident light is too high, electrical shutter causes a lot of noise. Intensity of incident light can be controlled by the optical shutter.

Relative illumination of imaging system should be uniform. Generally, the center of sensor has high illumination and corner of the sensor has low illumination. By controlling the optical shutter region by region differently, relative illumination can be improved. For example, exposure time of the center is less than the corner.

The present invention of the fast optical shutter of the micromirror motion has the following advantages: (1) the system has simple structure; (2) the optical shutter has fast response time; (3) the system provides simple control method; (4) the system needs no extra structures for shutter function; (5) The system has low power consumption since the MMAL is actuated by electrostatic force.

Although the present invention is briefly summarized herein, the full understanding of the invention can be obtained by the following drawings, detailed description, and appended claims.

DESCRIPTION OF THE FIGURES

These and other features, aspects, and advantages of the present invention will become better understood with reference to the accompanying drawings, wherein:

FIG. 6 shows the principle of the MMAL.

FIG. 7 is a schematic plan view showing the structure of the lens that is made of many micromirrors and actuating components.

DETAILED DESCRIPTION OF THE ILLUSTRATED EMBODIMENTS

Figure 1A:
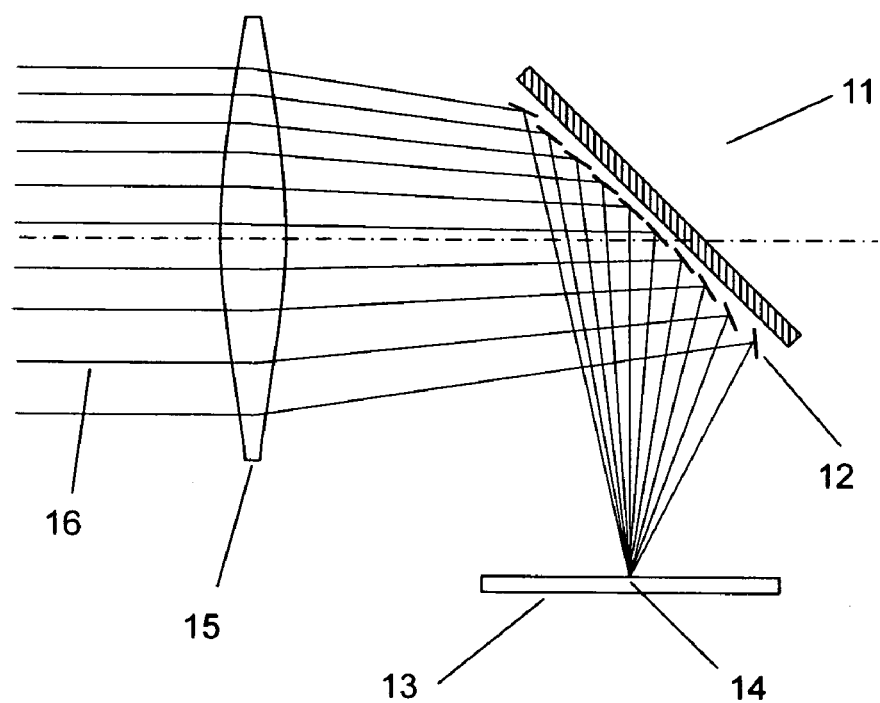
FIG. 1A–1B are schematic diagrams showing how the individual lights are focused onto the image plane (a) and are redirected out of the image sensor plane (b) by the MMAL.
Figure 1B:
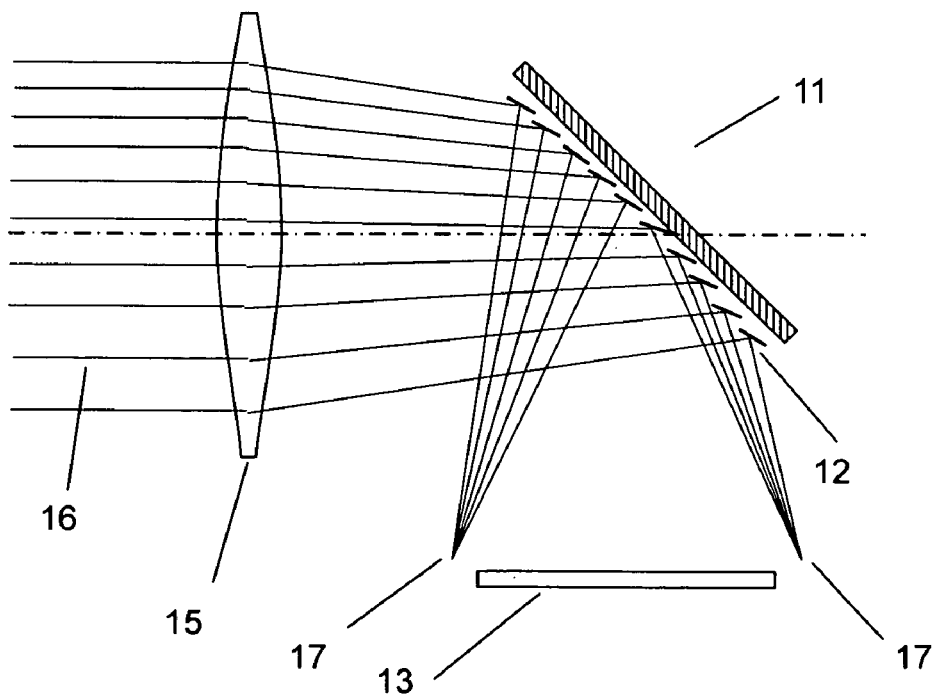

FIG. 1A–1B show how the optical shutter using MMAL works. In FIG. 1A, the incident lights 16 are converged onto the image sensor plane 13. The incident light 16 is first focused by the auxiliary lens 15 and the focused again by the MMAL 11. In the MMAL 11, each micromirror 12 changes its angle to make a focus 14 on the image plane 14. On the contrary, in FIG. 1B, the incident light 16 is reflected by the each micromirror and goes out of the image sensor plane. The redirected lights are reflected to the places 17 where image sensor 13 is not present.

Figure 2:
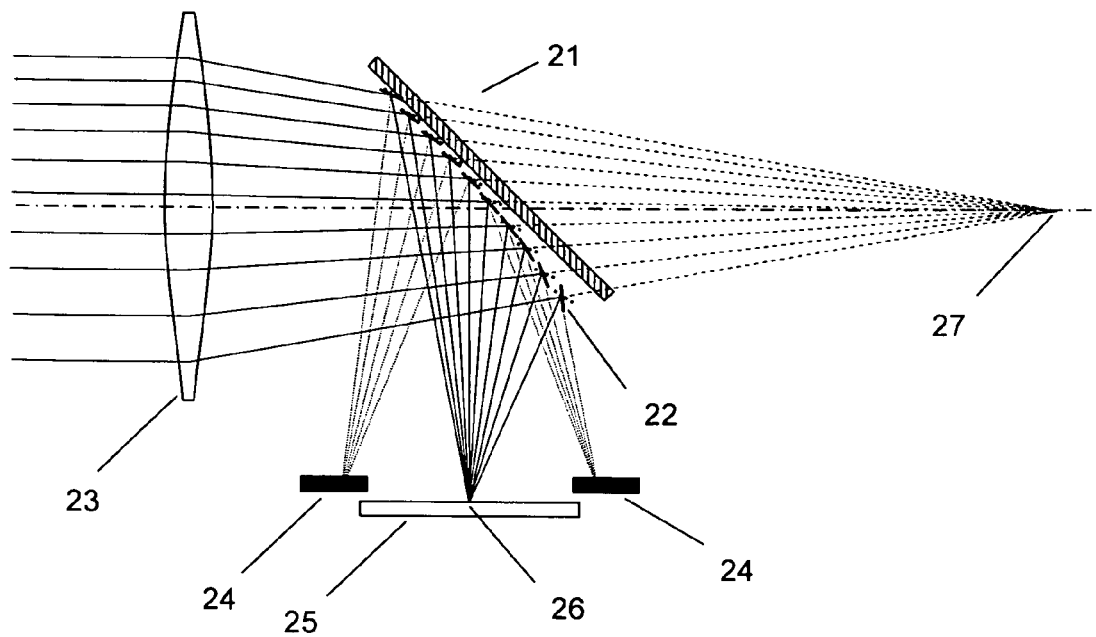
FIG. 2 is a schematic diagram showing how MMAL acts as a shutter with a beam block just before the image sensor.

In FIG. 2, the procedure of the MMAL shutter action is presented. Without the MMAL 21, the auxiliary lens 23 makes its focus at a point 27. The MMAL 21 changes the focal point 27 into a point 26 on the image sensor 25. The micromirror lens array lens 21 changes the focal length as well as the direction of the focused light. When the shutter function is on, each micromirror 22 changes its angle to redirect incident light 20 out of the image sensor 25. The MMAL shutter can further comprises optical block or blocks 24 to absorb the incident light reflected by the micromirror 22.

When the shutter function is on, the micromirrors have a motion to direct the incident light out of the image sensor. During directing the incident light out of the sensor, the incident light enters the image sensor. To minimize this effect, each mirror motion is random to direct incident light to random direction.

Figure 3:
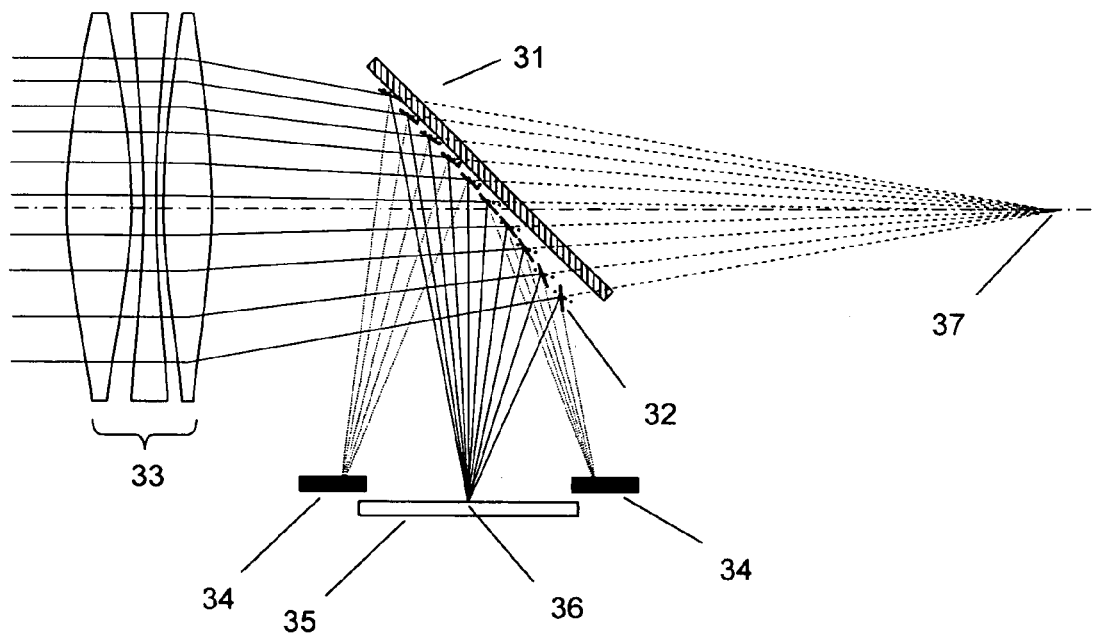
FIG. 3 is a schematic diagram showing how MMAL acts as a shutter with auxiliary lenses.

FIG. 3 is a schematic diagram showing how MMAL 31 acts as a shutter with auxiliary lenses 33. With the auxiliary lenses, the focusing power can be enhanced by the power of the auxiliary lens combination. The auxiliary lenses make their image on the spot 37 and the MMAL 31 refocuses the incident lights onto the image plane 35. In the image plane, the focus 36 of the whole optics system is formed and the system works its function. With the shutter function on, each micromirror 32 changes its angle and the direction of the each beam reflected. The reflected beam is blocked by the beam stop 34.

Figure 4:
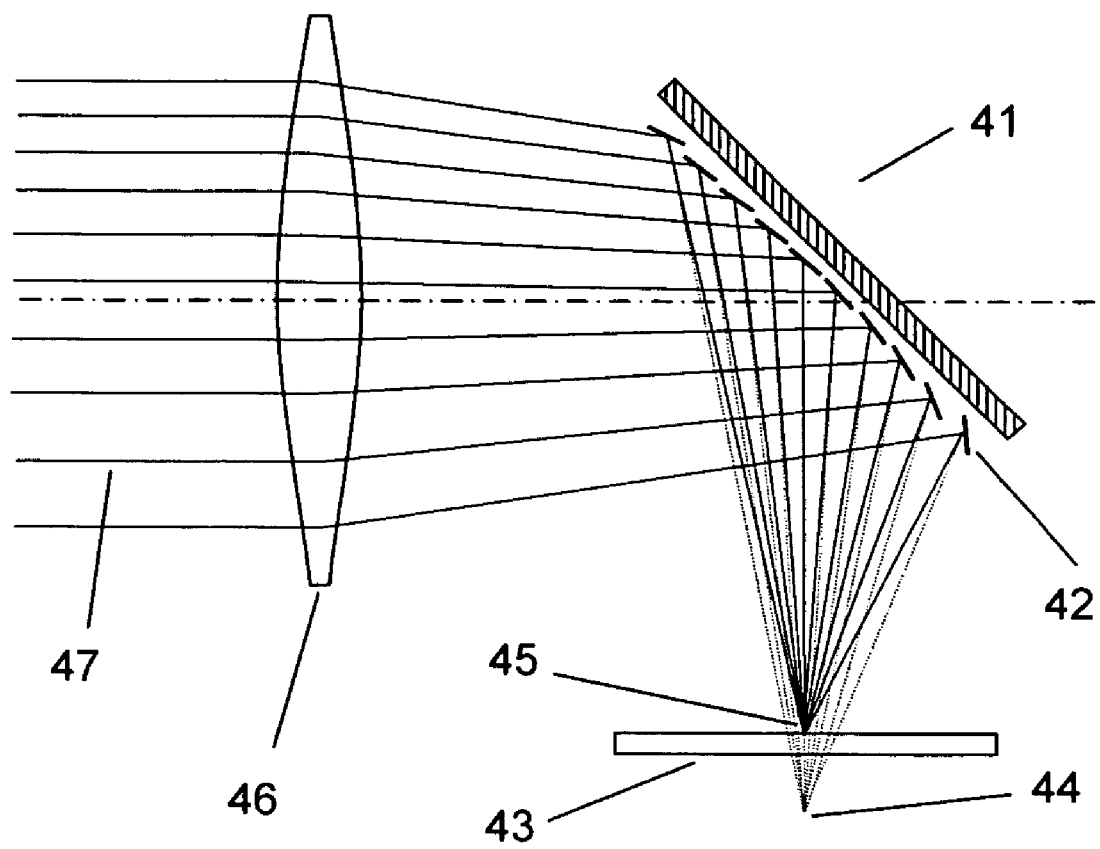
FIG. 4 is a schematic diagram showing how the MMAL makes auto focused image.

The MMAL 41 can also change its focal length by changing the angle of each micromirror 42. In FIG. 4, the focal length changing 44-45 mechanism by the MMAL 41 is presented. Incident beam 47 is focused by the combined power of the MMAL 41 and the auxiliary lens 46. MMAL 41 makes its focus at the point 45 onto the image plane 43 as well as at a point 44 out of the image plane 43. MMAL 41 can reduce its focal length as well as extend its focal length.

Figure 5A:
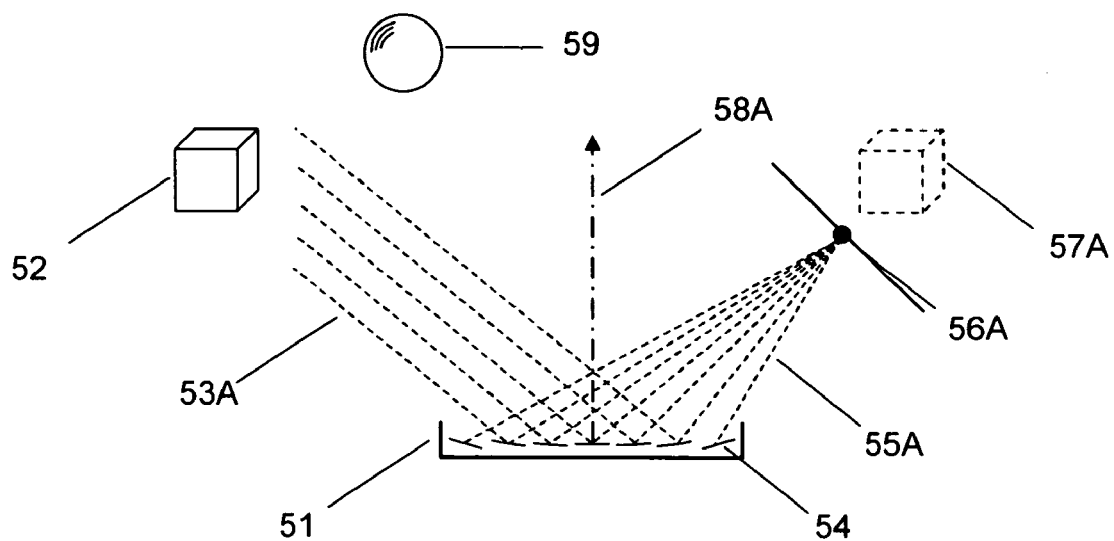
FIG. 5 is a schematic diagram showing how the MMAL changes its optical axis.
Figure 5B:
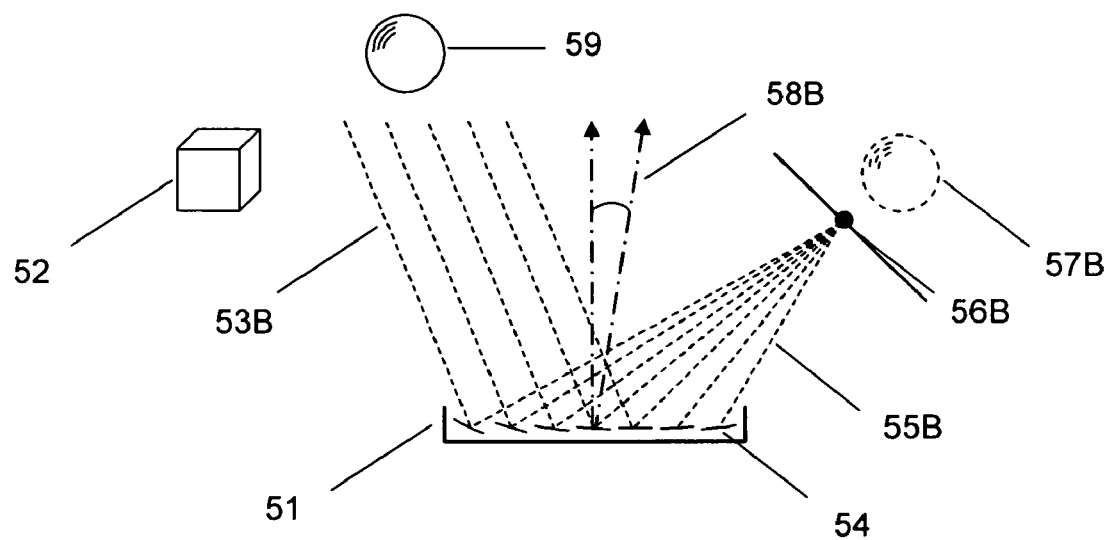

FIG. 5 is a schematic diagram showing how the MMAL 51 changes its optical axis 58A, 58B. The incident beams 53A, 53B are focused by MMAL 51. The collected beam is reflected by the surface of each micromirror 54 and then finally focused onto the image plane 56A, 56B. The MMAL 51 can change its optical axis by changing the angles of each micromirror 54. In FIG. 5A, the cube object 52 is imaged on the image plane 56A while the optical axis 58A is maintained as the normal direction of the MMAL 51. Also in FIG. 5B, the sphere 59 object is imaged on the image plane 56B with a tilted optical axis 58B. Even thought the MMAL 51 is not tilted, the MMAL changes its optical axis. The MMAL can focus 55A, 55B its image and can have different images 57A, 57B.

FIG. 6 shows the principle of a MMAL 61. Two conditions should be satisfied to build a perfect lens. One is a converging condition that all lights scattered by one point of an object should converge into one point of the image plane. The other is a same phase condition that all the converging lights at the image plane should have the same phase. To satisfy the perfect lens conditions, the surface shape of conventional reflective lens 62 reflects all the incident lights scattered from one point of an object to one point on the image plane with the same optical path length traveled. Thanks to the periodicity of the light phase, the same phase condition can be satisfied even though the optical path length of the converging light is different. When the difference of the optical path length is exactly the same as the multiples of the wavelength, the reflected beam at the focus meets the phase condition. Therefore, the surface shape of the conventional reflective lens 62 satisfying perfect lens conditions can be replaced by rotation and translation of micromirrors. Each micromirror 63 rotates to converge into focal point and translates to adjust the phase between the reflected lights from different micromirrors 63.

FIG. 7 illustrates the two-dimensional view of a MMAL 71. Each micromirror 72 of the MMAL 71 is controlled by electrostatic and/or electromagnetic force made by actuating components 73. Because a lens is axis-symmetric, the MMAL 71 can have a polar array of the micromirrors 72. Each of the micromirrors 72 can have a fan shape to maximize the effective reflecting area and increase the optical efficiency.

The mechanical structures upholding each micromirror and the actuating components to rotate and translate the micromirrors 72 are located under the micromirrors 72 so that the micromirrors 72 have larger active area.

Figure 8:
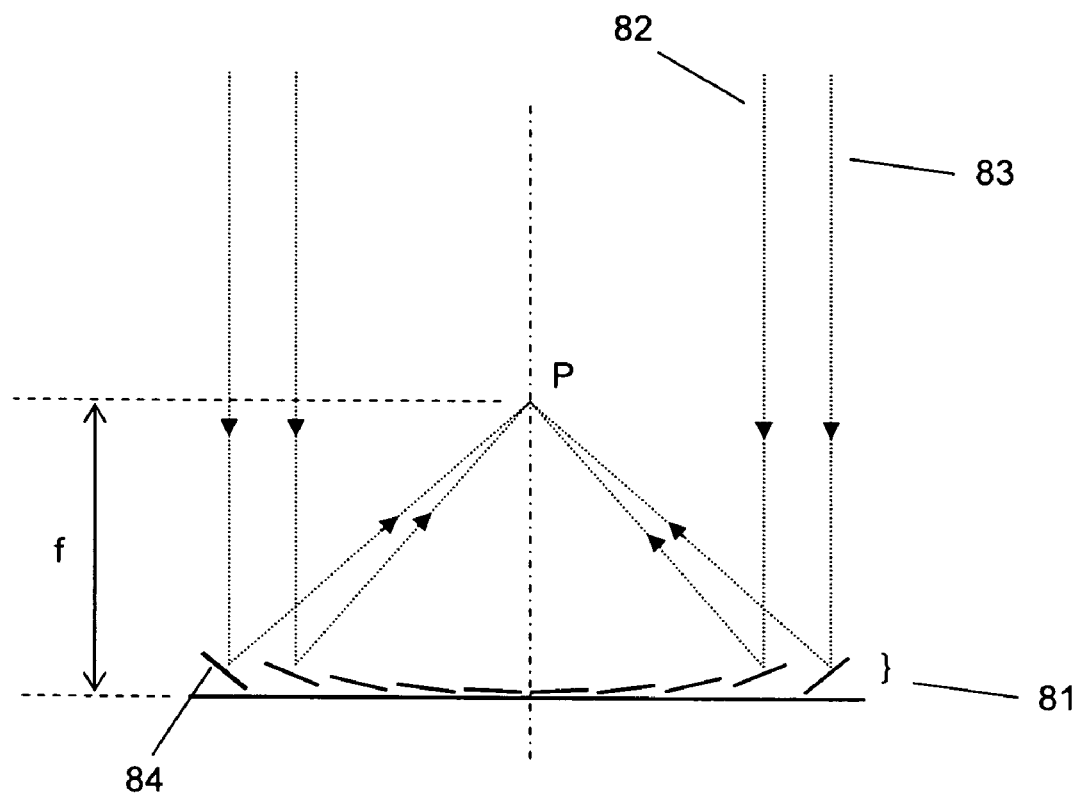
FIG. 8 is a schematic diagram showing how a MMAL works as a lens.

FIG. 8 illustrates how the MMAL 81 makes an image. Arbitrary scattered lights 82, 83 from the object are converged into one point P on the image plane by controlling the position of each of the micromirrors 84. Phases of individual lights 82, 83 can be adjusted to have the same value by translating each of the micromirrors 84. The required translational displacement is at least half of the wavelength of light.

The focal length f of the MMAL 81 is adjustable by controlling the rotation and/or translation of the micromirror 84. The operation of the MMAL 81 is possible by controlling only rotation regardless of the phase condition. In this case, the quality of the image generated by the MMAL is degraded by the aberration. Also translation only without rotation can form a Fresnel diffraction lens with the aberration. The smaller the sizes of the micromirrors 84 can reduce the aberration. Even though the focusing ability of the one motion by either rotation or translation is not powerful, the lens with one motion has the advantage of simple control and fabrication.

Since the ideal shape of the conventional lens 82 has a curvature even in the small size of the micromirror, it is strongly desired that each of the micromirrors 84 has a curvature itself. However, since the aberration of the lens with flat micromirrors 84 is not much different from the lens with curvature if the size of each micromirror is small enough, there is not much need to control the curvature.

While the invention has been shown and described with references to different embodiments thereof, it will be appreciated by those skills in the art that variations in form, detail, compositions and operation may be made without departing from the spirit and scope of the invention as defined by the accompanying claims.

What is claimed is:

1. A micromirror array lens with fast optical shutter function comprising a plurality of micromirrors wherein the micromirror array lens makes its focus onto image sensor with satisfying converging and same phase conditions while the shutter function is off and wherein each micromirror in the micromirror array lens changes its angle to redirect incident light out of the image sensor while the shutter function is on.

2. The micromirror array lens with fast optical shutter function in claim 1, wherein the micromirror array lens reflects the incident light out of the sensor when the shutter function is on and the micromirror array lens focuses the incident light on the sensor when the shutter function is off.

3. The micromirror array lens with fast optical shutter function in claim 1, wherein the micromirror array lens further comprises at least one optical block to absorb the incident light reflected by the micromirror array lens.

4. The micromirror array lens with fast optical shutter function in claim 1, wherein the micromirror array lens can change its optical axis.

5. The micromirror array lens with fast optical shutter function in claim 1, wherein the micromirror array lens prevents the image sensor to be over-exposed to light by using fast optical shutter function.

6. The micromirror array lens with fast optical shutter function in claim 1, wherein the micromirror array lens controls intensity of the incident light by controlling the optical shutter function region by region.

7. The micromirror array lens with fast optical shutter function in claim 1, wherein the micromirror array lens controls the relative illumination of an imaging system by controlling the optical shutter function of the micromirror array lens region by region.

8. The micromirror array lens with fast optical shutter function in claim 1, wherein each micromirror motion of the micromirror array lens is random to direct the incident light to random direction out of the image sensor.

* * * * *